US010759009B2

(12) United States Patent
Skelton et al.

(10) Patent No.: US 10,759,009 B2
(45) Date of Patent: Sep. 1, 2020

(54) FRICTION STIR WELDING FLASH AND BURR CONTROL

(71) Applicant: Hitachi Automotive Systems Americas, Inc., Harrodsburg, KY (US)

(72) Inventors: Hugh Skelton, Perryville, KY (US); Wei Yuan, Novi, MI (US)

(73) Assignee: HITACHI AUTOMOTIVE SYSTEMS AMERICAS, INC., Harrodsburg, KY (US)

( * ) Notice: Subject to any disclaimer, the term of this patent is extended or adjusted under 35 U.S.C. 154(b) by 225 days.

(21) Appl. No.: 15/700,281

(22) Filed: Sep. 11, 2017

(65) Prior Publication Data
US 2019/0076969 A1    Mar. 14, 2019

(51) Int. Cl.
| | |
|---|---|
| *B23K 20/12* | (2006.01) |
| *B23K 37/08* | (2006.01) |
| *B23K 20/233* | (2006.01) |
| *B23K 20/22* | (2006.01) |
| B23K 101/18 | (2006.01) |
| B23K 101/24 | (2006.01) |
| B23K 101/36 | (2006.01) |
| B23K 101/12 | (2006.01) |

(52) U.S. Cl.
CPC ............ *B23K 37/08* (2013.01); *B23K 20/126* (2013.01); *B23K 20/129* (2013.01); *B23K 20/1225* (2013.01); *B23K 20/1255* (2013.01); *B23K 20/22* (2013.01); *B23K 20/2336* (2013.01); *B23K 2101/12* (2018.08); *B23K 2101/18* (2018.08); *B23K 2101/24* (2018.08); *B23K 2101/36* (2018.08)

(58) Field of Classification Search
None
See application file for complete search history.

(56) References Cited

U.S. PATENT DOCUMENTS

| | | | | |
|---|---|---|---|---|
| 6,050,474 | A  * | 4/2000 | Aota | .................... B23K 20/122 |
| | | | | 228/112.1 |
| 6,311,889 | B1 | 11/2001 | Ezumi et al. | |
| 7,665,651 | B2 * | 2/2010 | Aota | .................... B23K 20/122 |
| | | | | 228/112.1 |
| 8,052,031 | B2 * | 11/2011 | Sano | .................. B23K 20/1225 |
| | | | | 228/112.1 |
| 8,910,851 | B2 | 12/2014 | Rosal et al. | |
| 9,095,926 | B2 * | 8/2015 | Okada | ................ B23K 20/1265 |
| 2001/0004989 | A1 | 6/2001 | Ezumi et al. | |
| 2007/0181649 | A1 * | 8/2007 | Park | .................... B23K 20/1265 |
| | | | | 228/101 |
| 2009/0236403 | A1 * | 9/2009 | Feng | .................. B23K 20/1225 |
| | | | | 228/112.1 |

(Continued)

*Primary Examiner* — Devang R Patel
(74) *Attorney, Agent, or Firm* — Mattingly & Malur, PC

(57) ABSTRACT

Some examples include welding a first workpiece to a second workpiece. For instance, the first workpiece may be secured adjacent to the second workpiece. At least one of the first workpiece or the second workpiece includes a channel or a portion of a channel in a respective surface such that a complete channel is presented when the first workpiece and the second workpiece are secured adjacent to each other. A rotating tip of a welding tool is inserted into the complete channel for welding the first workpiece to the second workpiece. A surface burr resulting from the welding is located within the complete channel.

11 Claims, 12 Drawing Sheets

(56) References Cited

U.S. PATENT DOCUMENTS

2010/0101768 A1* 4/2010 Seo .................. B23K 20/122
                                                                                  165/168
2014/0210070 A1* 7/2014 Hori .................. B23K 20/122
                                                                                  428/615
2015/0183054 A1* 7/2015 Okada ............... B23K 20/1255
                                                                                  228/2.1

* cited by examiner

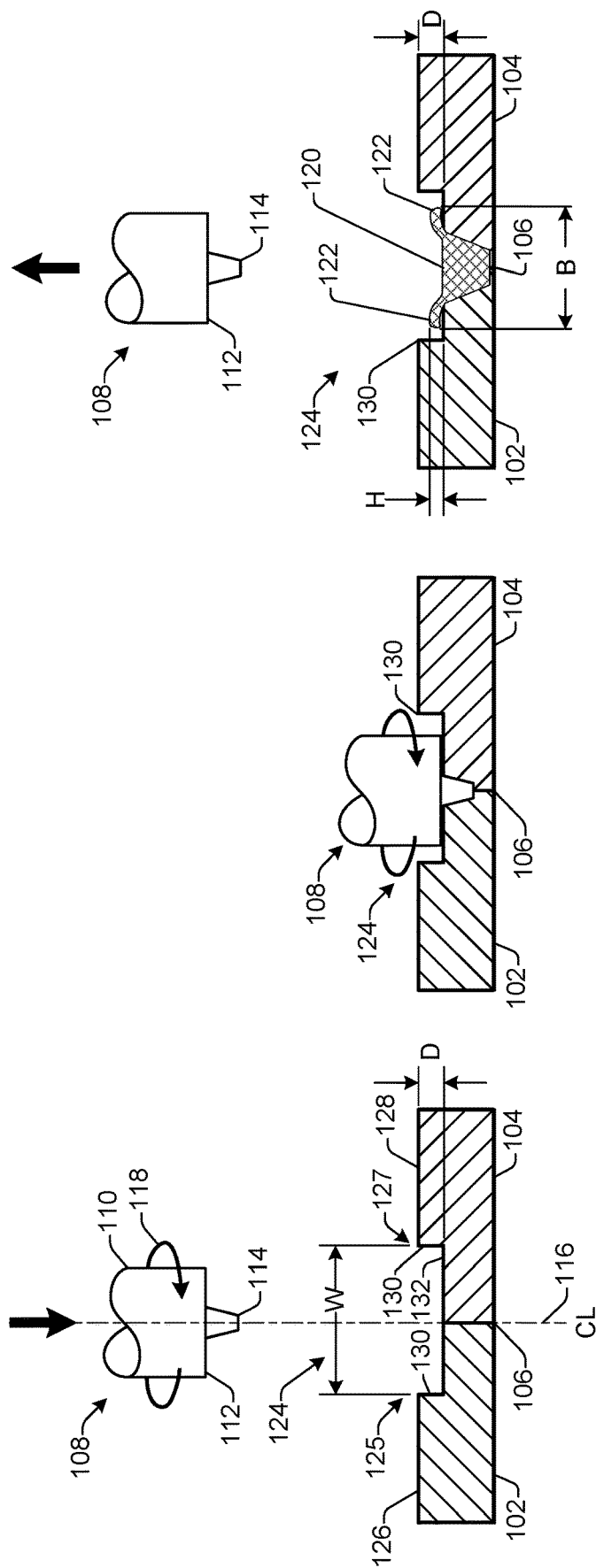

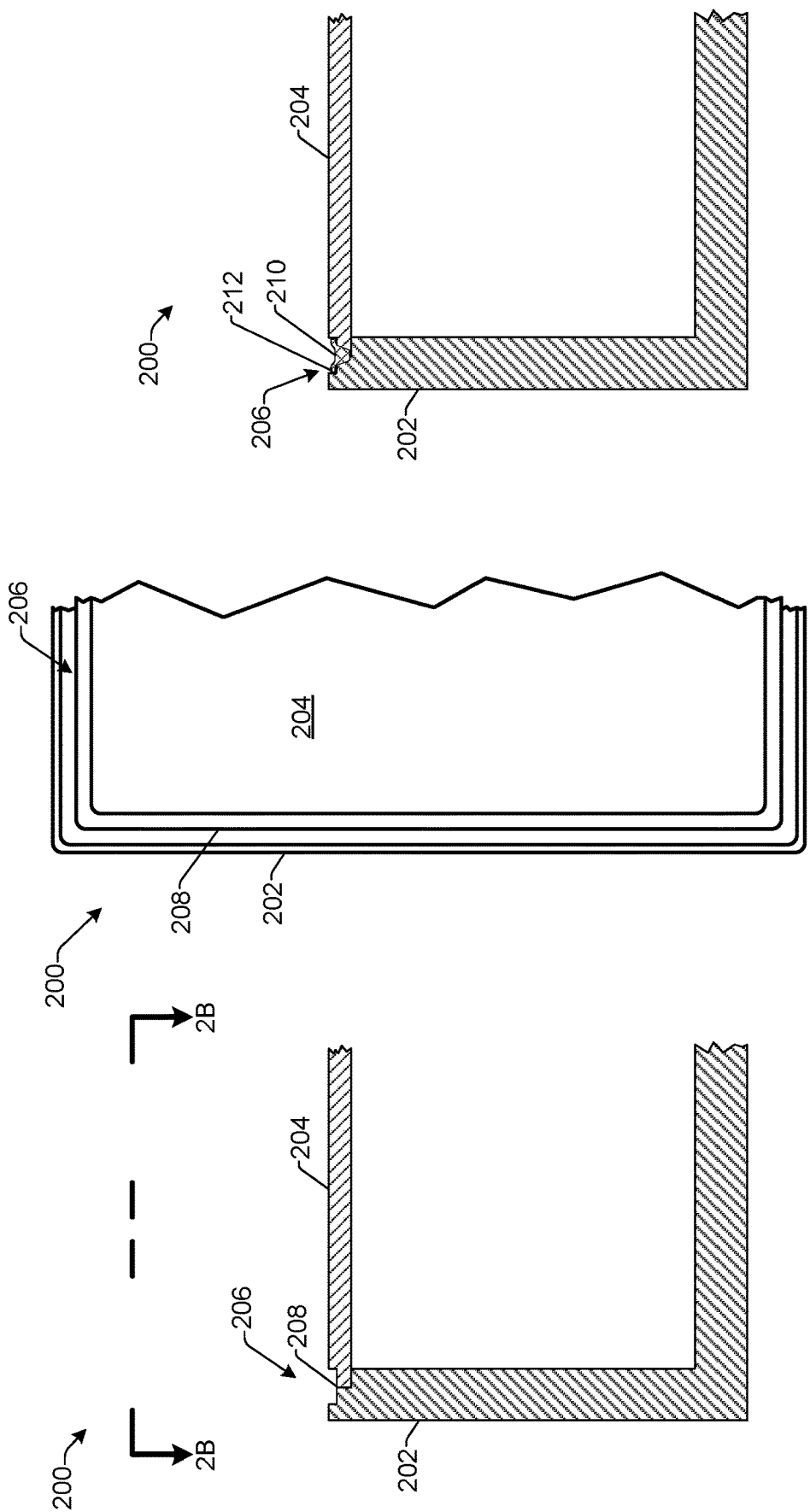

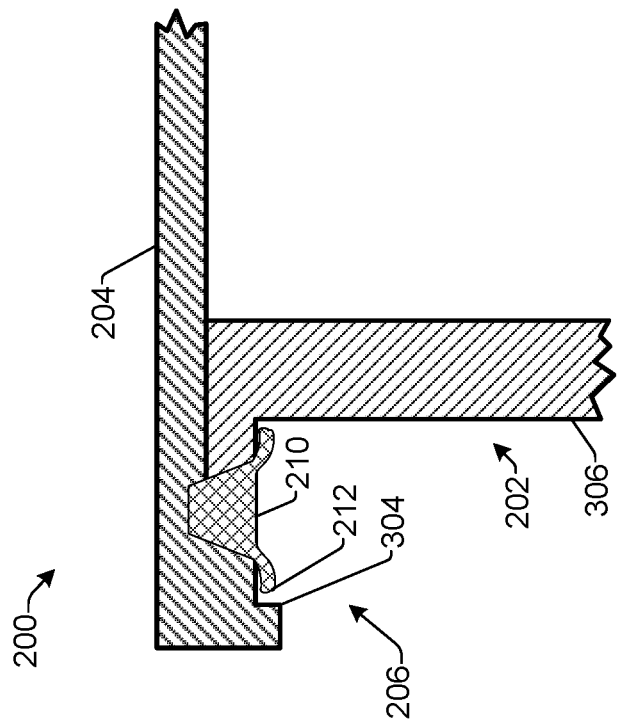
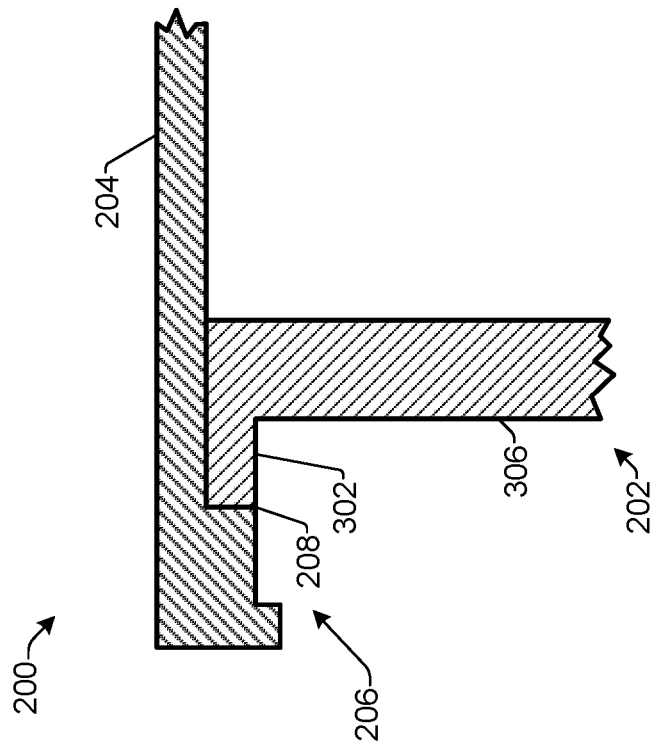

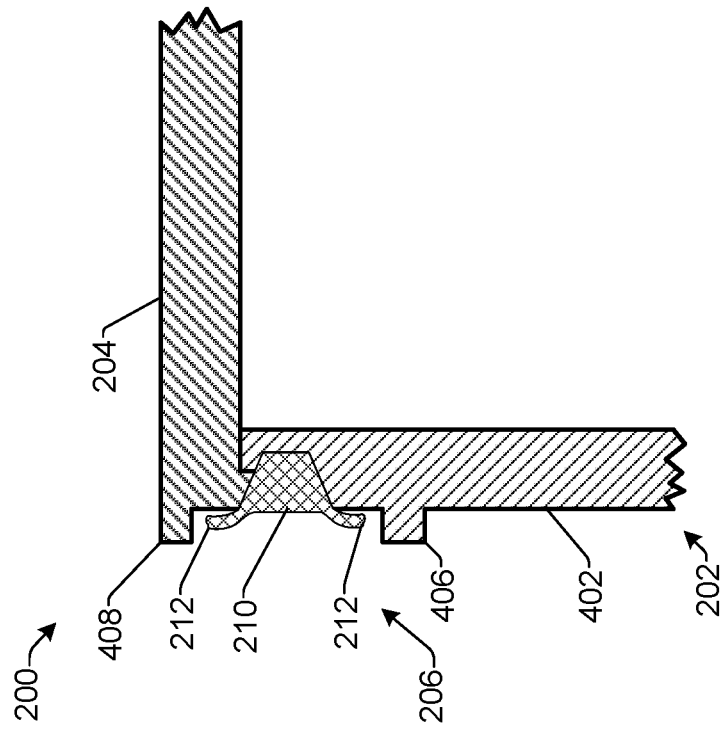
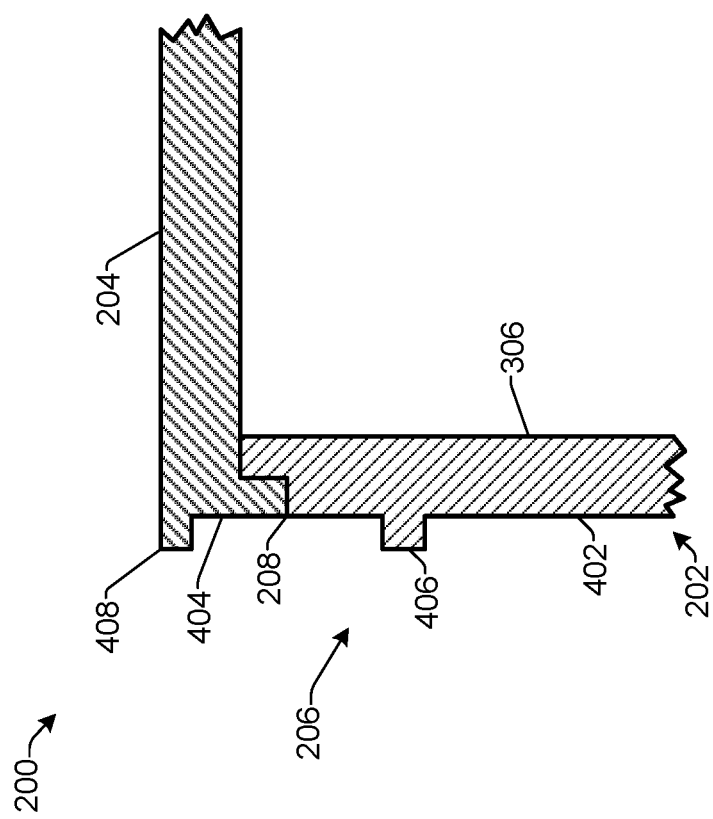
FIG. 4B
FIG. 4A

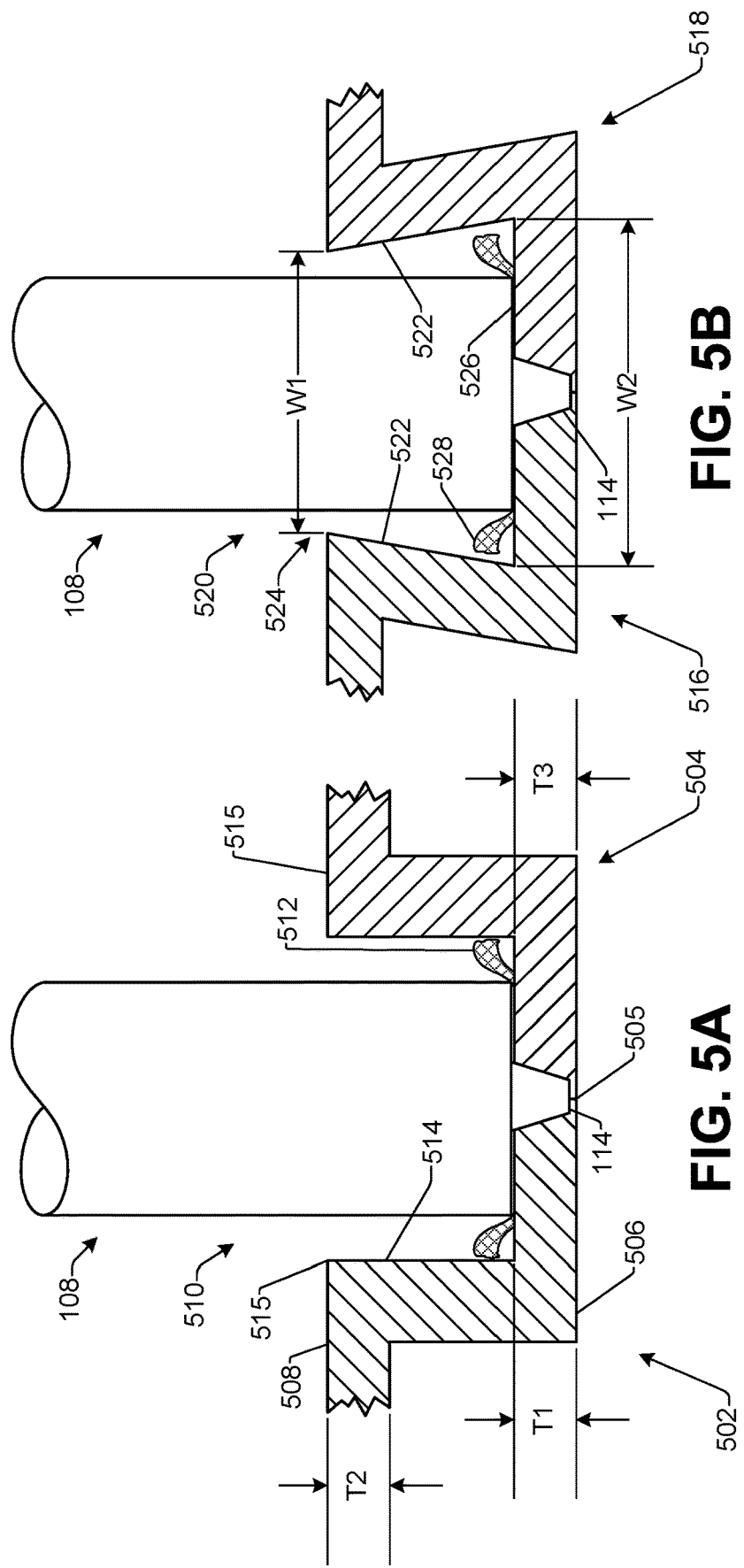

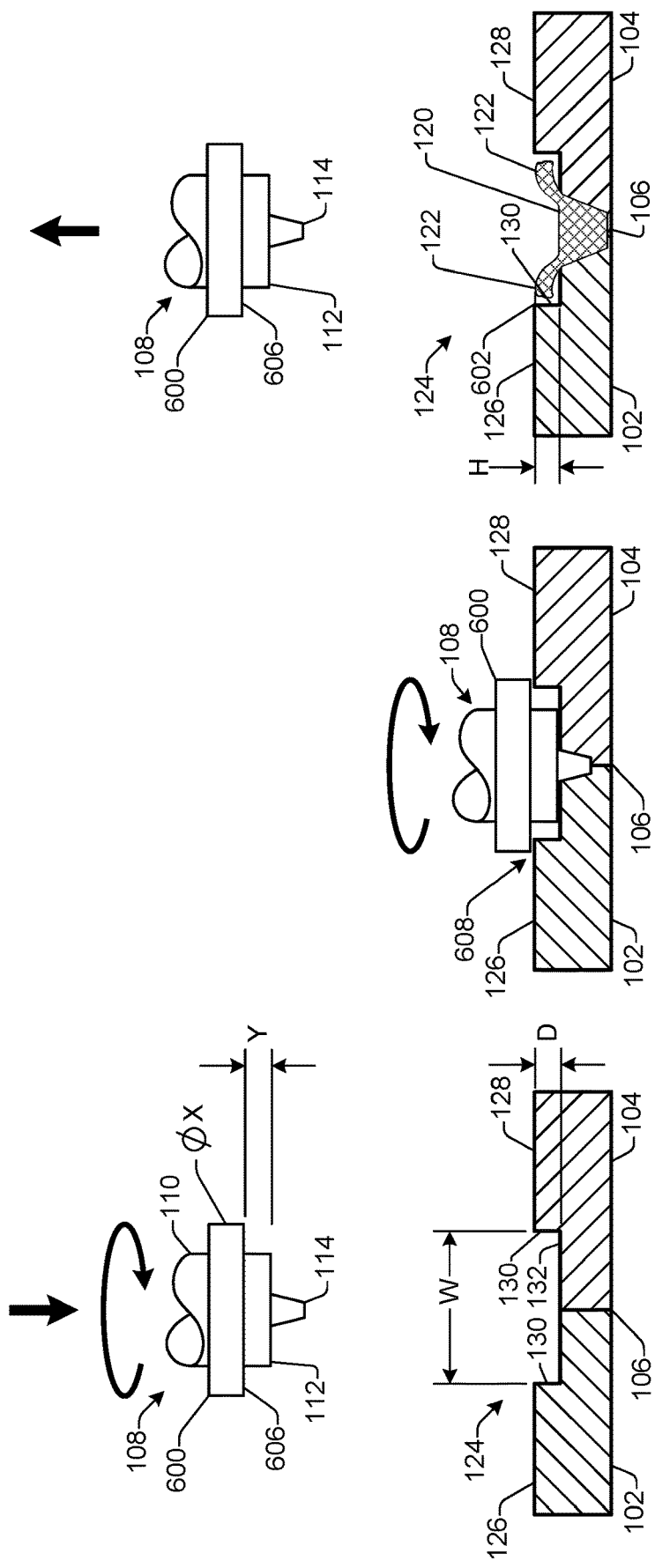

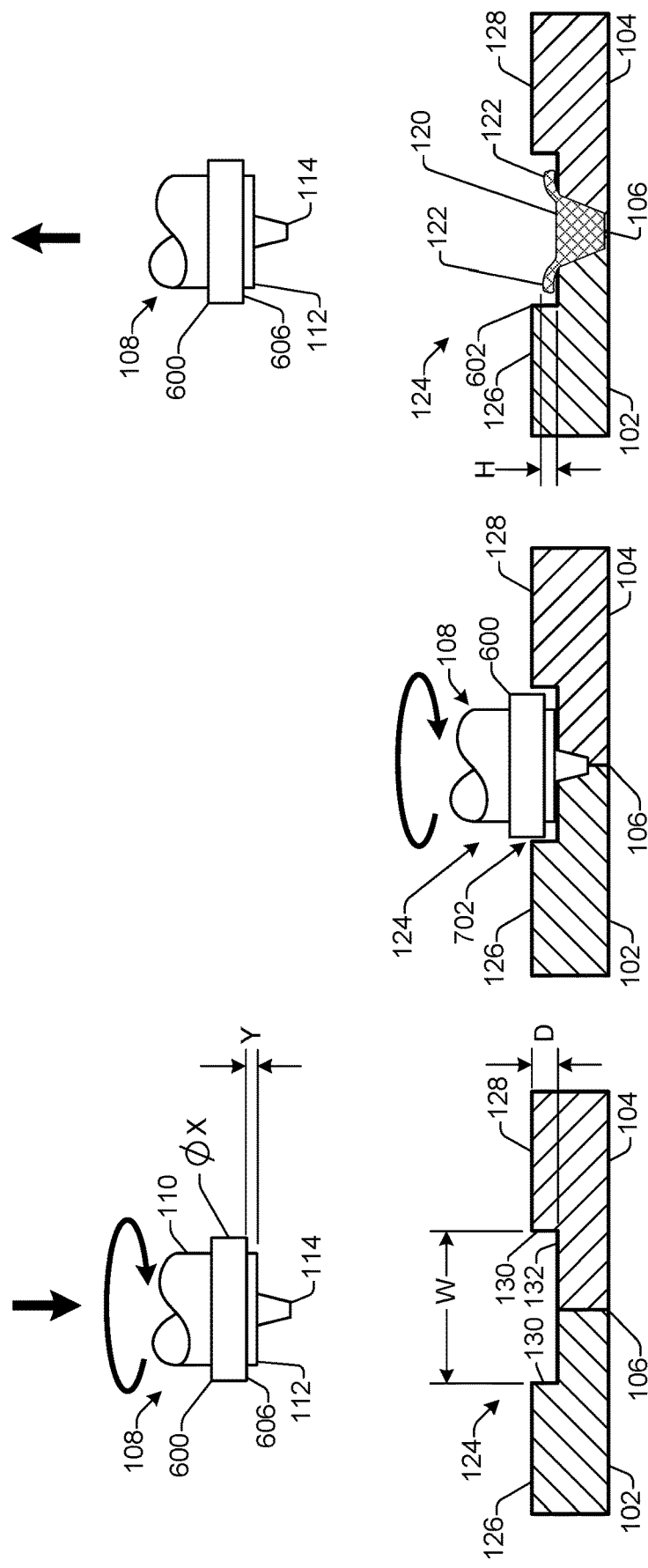

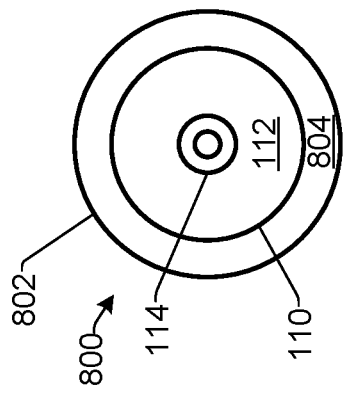
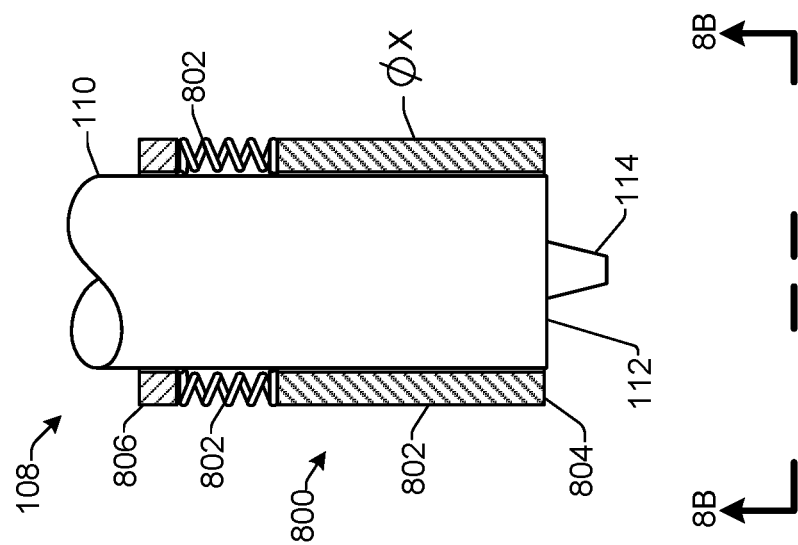
FIG. 8B
FIG. 8A

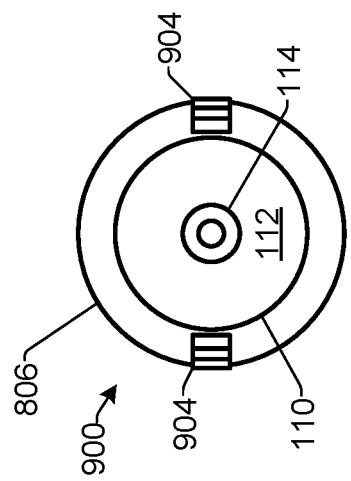
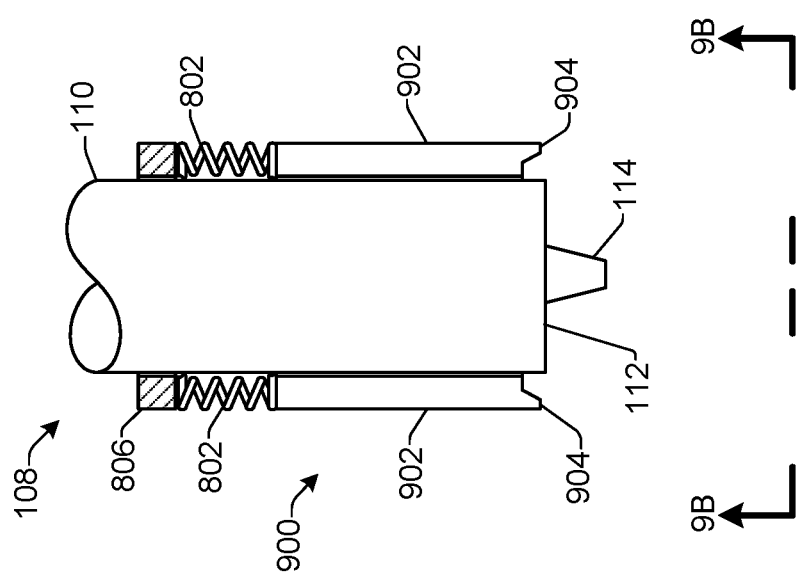
FIG. 9B
FIG. 9A

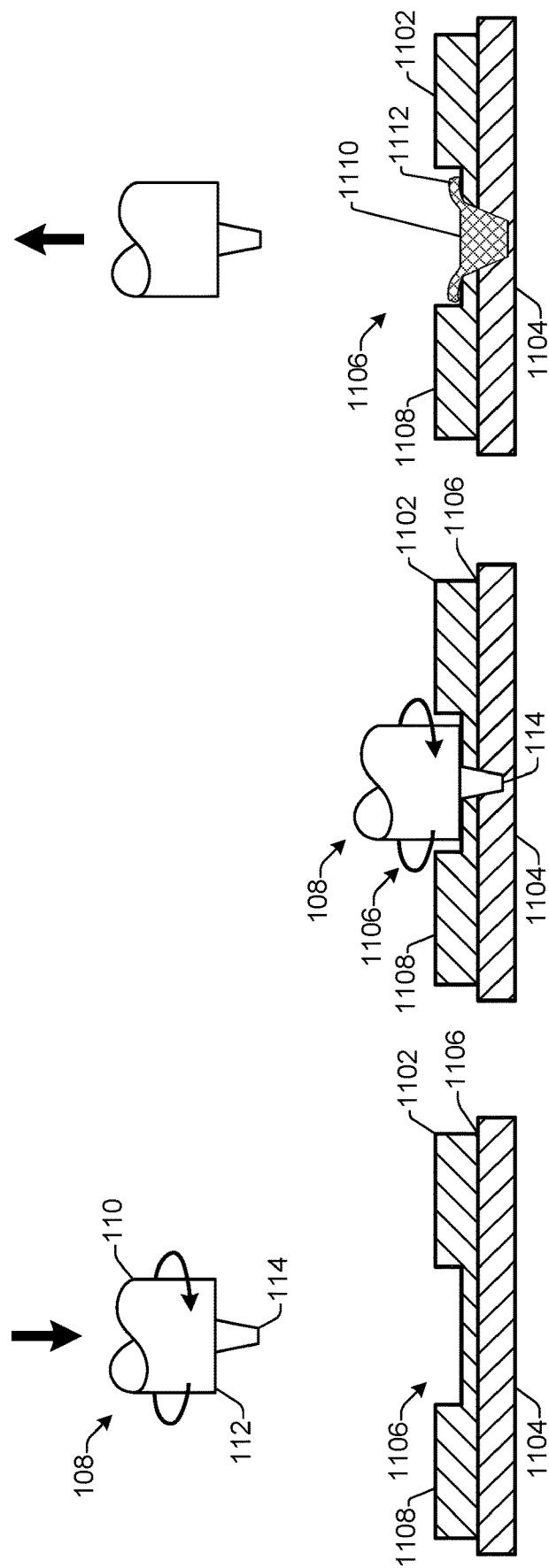

FRICTION STIR WELDING FLASH AND BURR CONTROL

BACKGROUND

Friction stir welding is a relatively new technology that has been developed for joining metals, alloys, and other solid weldable materials. One challenge when performing friction stir welding is dealing with the surface burr that is present after the welding has been performed. The surface burr is typically formed on the surface of the welded material adjacent to the weld bead. The surface burr can be sharp and may be a safety concern when handling welded components. Conventionally, the surface burr may be removed, such as by using a cutter during welding or via post-welding machining. The conventional techniques can increase manufacturing cost, complexity of production setup, and may introduce particulates to the welded components and/or the manufacturing environment, which may not be tolerable in some cases, such as in cleanroom environments, or in cases in which the welding is performed in the presence of sensitive components, such as electronics.

SUMMARY

Some implementations include arrangements and techniques for friction stir welding a first workpiece to a second workpiece. For instance, the first workpiece may be secured adjacent to the second workpiece. At least one of the first workpiece or the second workpiece includes a channel or a portion of a channel in a respective surface such that a complete channel is presented when the first workpiece and the second workpiece are secured adjacent to each other. A rotating tip of a welding tool is inserted into the complete channel for welding the first workpiece to the second workpiece. A surface burr resulting from the welding is located within the complete channel following the welding.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1A-1C illustrate a cross-sectional view of workpieces configured for a friction stir welding process according to some implementations.

FIGS. 2A-2C illustrate a cross-sectional view and a top view of a container configured for being welded according to some implementations.

FIGS. 3A-3B illustrate a cross-sectional view of an example cover and housing joint of the container of FIGS. 2A-2C according to some implementations.

FIGS. 4A-4B illustrate a cross-sectional view of an example cover and housing joint of the container of FIGS. 2A-2C according to some implementations.

FIGS. 5A-5B illustrate cross-sectional views of workpieces configured for a friction stir welding process according to some implementations.

FIGS. 6A-6C illustrate an example friction stir welding tool including a burr control device according to some implementations.

FIGS. 7A-7C illustrate an example friction stir welding tool including a burr control device according to some implementations.

FIGS. 8A-8B illustrate an example friction stir welding tool including a burr control device according to some implementations.

FIGS. 9A-9B illustrate an example friction stir welding tool including a burr control device according to some implementations.

FIGS. 11A-11C illustrate a cross-sectional view of workpieces configured for a friction stir welding process according to some implementations.

DETAILED DESCRIPTION

Figure 10B:
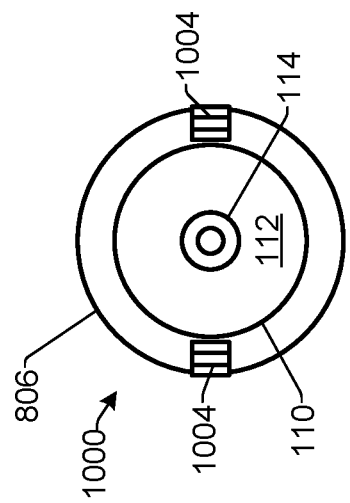
FIGS. 10A-10B illustrate an example friction stir welding tool including a burr control device according to some implementations.

The technology herein includes novel arrangements and techniques for friction stir welding that provide protection from a surface burr without requiring removal of the surface burr. To the contrary, implementations herein may leave the surface burr in place following welding. In some examples, an open channel, e.g., having a generally U-shaped cross-section may be formed at a location of the workpieces where the welding is to be performed. For instance, one-half of the open channel may be formed in each half of each workpiece at the joint of the two workpieces where the weld will be formed. As another example, such as in the case of spot welding or lap welding, the channel may be formed in a surface of one of the workpieces at the location of the weld. As still another example, in the case of friction stir processing, the channel may be formed in a workpiece at a location intended for the stir processing. In any of these examples, the channel may be formed to have a depth that is deeper than an expected height of the surface burr. The channel or channel portion may be formed in advance when each workpiece is originally made through conventional manufacturing processes, such as by stamping, casting, etching, or machining.

The workpieces to be joined may be secured or otherwise positioned in contact and adjacent to each other along a seam that will form the weld joint. The friction stir weld joint may be made along the bottom surface of the channel, e.g., following the seam between the two work pieces. The width of the channel may be sized so that the surface burr touches or is near to the sidewalls of the channel following formation of the weld. In some examples, if the surface burr is expected to be higher than the sidewall of the channel, additional control to the surface burr may be performed by blunting or otherwise smoothing the surface burr using an added rotating or non-rotating component mounted on the friction stir welding tool. Accordingly, some implementations are able to control the location of the surface burr in a manufacturing-environment-friendly manner, while rendering the surface burr hazard-free for handling of the welded components such as during transportation or installation.

In addition, some examples herein relate to friction stir welding of an electronic container having a housing and a cover. For example, an enclosure or other container for electronic components may have a cover that is welded to a housing of the container during assembly of the electronic components in a cleanroom or other low particulate manufacturing environment. Implementations herein enable the friction stir welding to be performed without contaminating the manufacturing environment and without requiring subsequent machining of the electronic component container following welding. Accordingly, some implementations herein may be used for friction stir welding of small-sized components or structures and/or parts that are sensitive to the presence of metal chips or other metal particulates.

Some examples herein enable the creation of friction stir welds while leaving the surface burr in place following the welding procedure. These examples enable the welded component to be safely handled by a person without having to worry about injury from the surface burr even though the surface burr remains in place. Accordingly, in the examples herein, the surface burr is not cut off or machined away, and therefore examples herein may reduce manufacturing costs and reduce the likelihood of creating contaminants in a manufacturing environment.

For discussion purposes, some example implementations are described in the environment of friction stir welding of components, or the like. However, implementations herein are not limited to the particular examples provided, and may be extended to other manufacturing environments, other applications, and other types of welding, as will be apparent to those of skill in the art in light of the disclosure herein.

For instance, while some examples are related to welding a container for an electronic control unit (ECU), the channel welding concept for surface burr treatment herein may be applied in other applications, such as any friction stir welding application, as well as to variations of friction stir welding including, but not limited to, friction stir processing, friction stir spot welding, friction stir spot joining, friction bit joining, and the like, which may also generate a surface burr (also sometimes referred to as "flash"). For example, when performing friction stir spot welding, friction stir spot joining, or friction bit joining, a surface burr may occur surrounding a spot weld rather than along a weld bead. Accordingly, in these implementations, rather than forming an open channel in the workpiece(s), a round socket may be formed on one of the workpieces on the side where the welding tool will enter the material. Alternatively, such as in the case of multiple spot welds formed in line, a channel may be formed along the line. Additionally, in some examples, three or more workpieces may be welded together using the techniques described herein. Consequently, implementations herein are not limited to joining only two workpieces. Numerous other variations will be apparent to those of skill in the art having the benefit of the disclosure herein.

FIGS. 1A-1C illustrate a cross-sectional view of workpieces configured for a friction stir welding process according to some implementations. As shown in FIGS. 1A-1C, the friction stir welding herein generally involves placing a first workpiece 102 adjacent to a second workpiece 104 so that there is a seam 106 between the first workpiece 102 and the second workpiece 104. The first workpiece 102 and the second workpiece 104 may be clamped or otherwise secured in relation to each other, and are then adjoined by welding to each other using a welding tool 108.

The welding tool 108 may include a tool body 110, with a tool shoulder 112 and a central tool tip 114. During friction stir welding, the welding tool 108 is rotated around a tool axis corresponding to a centerline 116, as indicated by arrow 118. In some cases, the tool axis may align with the seam 106 during the stir welding process, while in other cases, the tool axis may be offset slightly from the seam 106 during the stir welding process. In this example, the tool tip 114 is inserted into the material of the workpieces 102 and 104 at the seam 106, as illustrated at FIG. 1B. The rotation of the tool tip 114 in the material of the workpieces 102 and 104 causes the material of the workpieces 102 and 104 to heat and mix together and thereby join together the two workpieces 102 and 104, as indicated at FIG. 1C. The frictional heat generated by the tool tip 114 and tool shoulder 112 creates a solid bonding between the workpieces 102 and 104 in the form of a weld joint 120.

The tool tip 114 may be moved or otherwise traversed along the seam 106 to join the two workpieces 102 and 104 and form the weld joint 120. As the tool tip 114 traverses the seam 106, a surface burr 122 may typically be generated adjacent to, and on either side of, the weld joint 120 as softened material is extruded outward when the welding tool 108 is inserted into and traverses along the seam 106.

Conventionally, the surface burr 122 is removed, such as by grinding after welding, due to safety concerns (e.g., to avoid cutting or snagging due to sharp edges of the surface burr 122) or to meet surface appearance requirements. For instance, a surface burr may be sharp in nature, which creates challenges to personnel handling the welded parts. Cutting of the surface burr during the welding process or post-welding machining may not only introduce additional cycle time or cost to the manufacturing process, but also may create challenges for clean room operations, such as in the case of electronic components that are sensitive to the metal chips, metal dust, or other metal particulates.

Contrary to conventional treatments for removing the surface burr, implementations herein may preserve, control, and, in some cases, modify the surface burr 122. In the example of FIGS. 1A-1C, prior to performing the friction stir welding process, a channel 124 may be formed in the workpieces 102 and 104 at the location of the seam 106. For example, a first channel portion 125 may be formed in an upper surface 126 of the first workpiece 102 and a second channel portion 127 of the channel 124 may be formed in an upper surface 128 of the second workpiece 104. Thus, when the two workpieces 102 and 104 are placed adjacent to one another for welding, the first channel portion 125 and the second channel portion 127 combine to present a complete channel 124 that includes a pair of sidewalls 130 and a bottom surface 132.

The channel 124 (i.e., the channel portions 125 and 127 in this example) may be formed using any suitable manufacturing technique such as stamping, casting, machining, etching, or the like. Such mechanical forming processes may be performed during the same manufacturing process that is used to form the workpieces 102 and 104. For example, if the workpiece 102 or 104 is created by stamping, then the stamp may be initially created to also create the respective channel portion for that workpiece 102 or 104. For instance, if the material is being stamped to create a flat sheet, the flat sheet may be just as easily stamped with the channel portion formed along the edge of the sheet during a single stamping manufacturing step. Similarly, the channel portion may be easily made by casting, or the like.

The complete channel 124 may have a width W and a depth D that are selected based on the expected breadth B and height H, respectively, of the surface burr 122. For example, the depth D of the channel 124 may be greater than the expected height H of the surface burr 122. Furthermore, the width W of the channel may be greater than or equal to the expected overall breadth B of the surface burr 122 including the weld joint 120. However, the width W of the channel 124 is also sufficiently wide to accommodate the shoulder 112 of the welding tool 108, but not so wide that a person would be able to insert a finger between the surface burr 122 and a side wall 130 of the channel 124. As one example, a desired distance between the surface burr 122 and the sidewall 130 maybe to be between 0 and ¼ inch. In this example, as illustrated in FIG. 1C, the surface burr 122 created adjacent to the weld joint 120 is contained in the channel 124 following completion of the welding process.

FIGS. 2A-2C illustrate a cross-sectional and top view of a container 200 configured for assembly using friction stir welding according to some implementations. In this example, FIG. 2A illustrates a cross-sectional view of two workpieces for joining by friction stir welding, including a housing 202 and a cover 204 of the container 200. The techniques herein enable the container 200 to be assembled and sealed by welding in a cleanroom or other low-particulate manufacturing environment, although implementations herein are not limited to use in any particular manufacturing environment.

As an example, the housing 202 and cover 204 may be made of stamped or cast aluminum alloys or other weldable material, and each of the housing 202 and cover 204 may include a portion of a complete channel 206, which may correspond to the channel 124 discussed above with respect to FIGS. 1A-1C. Electronic components (not shown in FIGS. 2A-2C) may be placed in the housing 202 and the cover 204 may then be placed on the housing 202 so that the edges of the respective channel portions are abutting to form a seam 208, which may correspond to the seam 106 discussed above. In some examples, the cover 204 may be mechanically clamped to the housing 202, or otherwise secured with respect to the housing 202, for performing the friction stir welding process.

FIG. 2B illustrates a reduced-size top view of the container 200, as viewed along line 2B-2B of FIG. 2A, showing the cover 204 installed on the housing 202 prior to performing the welding process. As illustrated, the channel 206 may extend around the entire perimeter of the cover 204 to enable the cover 204 to be welded to the housing 202 for hermetically sealing the interior of the housing 202. Various different locations and configurations of the channel 206 may be employed to optimize the design of the container 200, such as for reducing the overall weight of the container, simplifying the production setup, or the like. Several additional examples of channel locations and configurations are discussed below with respect to FIGS. 3A-3B and 4A-4B.

The cover 204 may be welded to the housing 202 to form the sealed container 200 with the electronic components hermetically sealed therein. FIG. 2C illustrates that a weld joint 210 and a surface burr 212 are maintained within the channel 206 following completion of the welding process. The friction stir welding process described herein simplifies the manufacturing process by removing the need to perform machining of the surface burr, reduces the overall cost, and eliminates the potential impact of machined chips, dust, or other particulates on the manufacturing environment and or the electronic components contained in the container 200.

FIGS. 3A-3B illustrate an enlarged cross-sectional view of an example cover and housing joint for the container 200 of FIG. 2 according to some implementations. FIGS. 3A-3B show one possible alternative location and configuration of the channel 206. In this example, the channel 206 is located on an underside of the cover 204, which abuts to a lip 302 of the housing 202. Compared to placing the channel 206 on the top surface of the cover 204, placing the channel 206 under the cover 204 may provide benefits in addition to the surface burr control discussed above. In the example of FIG. 3A, the friction stir welding may be performed either by turning the container 200 upside down or reversing the direction at which the welding tool engages the seam 208 to form the weld joint 210, with the surface burr 212 maintained within an outer edge 304 of the channel 206.

A benefit of the configuration of FIGS. 3A and 3B includes more limited accessibility and visibility of the weld joint 210 and the surface burr 212. Another benefit includes reduced dependence on a wall 306 of the housing 202 to support the container from collapse during friction stir welding. Accordingly, because the welding may be performed with the cover 204 and the housing 202 upside down, the thickness of the wall 306 of the housing 202 may be significantly reduced, in turn reducing the weight of the container 200, and the overall weight of the ECU or other electrical component contained by the container 200. Thus, the configuration of FIGS. 3A-3B simplifies the clamping and fixturing required during welding, as in many cases, the cover 204 is flat but the underside of the housing 202 may not be. The channel 206 may be formed either by creating the channel in one workpiece 202 or 204 and lap welding the two workpieces (as discussed additionally below with respect to FIGS. 11A-11C), or by creating a half channel in each of the two workpieces 202 and 204, and butt welding the two workpieces 202 and 204, as illustrated in this example.

FIGS. 4A-4B illustrate an enlarged cross-sectional view of an example cover and housing joint for the container 200 of FIG. 2 according to some implementations. In this example, the channel 206 is formed around the outside surface 402 of the wall 306 of the housing 202 and an outer edge 404 of the cover 204. Further, a protrusion 406 may be formed on the outside surface 402 of the wall 306, for forming one sidewall of the channel 206, while a lip 408 may be formed on the perimeter of the cover 204 for forming the other sidewall of the channel 206. As illustrated in FIG. 4B, when the weld joint 210 is formed at the seam 208, the surface burr is maintained with the channel 206 formed by the protrusion 406 and the lip 408. Thus, in this example, instead of forming the channel into the surface of the workpiece, a protrusion and matching lip are formed in the respective workpieces 202, 204 to produce the complete channel 206.

FIGS. 5A-5B illustrate cross-sectional views of workpieces configured for a friction stir welding process according to some implementations. In the example of FIG. 5A, the thicknesses of various portions of a first workpiece 502 and a second workpiece 504 to be welded together at a seam 505 may be different at different locations in the workpieces 502 and 504. For example a thickness T1 of a first portion 506 of the first workpiece may be thicker than, the same thickness as, or less thick than a thickness T2 of a second portion 508 of the first workpiece 502, and thickness of the second workpiece 504 may be similarly or differently varied. Furthermore, a thickness T3 of the second workpiece 504 may be same as, or different from, the thickness T1 of the first workpiece 502, such as at the seam 505, without affecting the integrity of the weld.

In this example, a complete channel 510 may be formed from two opposed channel portions formed in the two workpieces 502 and 504 that is deeper than a height of a surface burr 512. Depending on the material/geometry used and the welding parameters adopted, the height and width of the channel 510 and/or the shape of the channel may be optimized in such a way that the surface burr 512 remains below the top surface, while the weld has the same strength or sealing requirement as those made without creating such a channel 510. In FIG. 5A, the axis of rotation of tool 108 is parallel to the walls 514 of the channel 510, while the thickness T1, T2, etc. of workpiece 502 in the channel portion can be same or different from the other portion T1, T2, etc. The depth of the channel 510 may be optimized, so the surface burr 512 remains below an upper surface 515 of each workpiece 502, 504.

FIG. 5B illustrates a first workpiece 516 and a second workpiece 518 together forming a complete channel 520. In this example, the walls 522 of the channel 520 are slanted inward toward an opening 524 of the channel 520. In this example, the upper portion of the channel 520 at the opening 524 has a width W1 that is smaller than a width W2 at a bottom 526 of the channel 520. In this case, the surface burr 528 may be deviated downwards by the slant if the surface burr 528 contacts the inner wall 522 and be more securely retained inside of the channel 520 by the slanted inner wall 522. Another benefit of the slanted inner wall 522 is that the reduced size of channel opening 524 may further reduce the possibility of exposing the surface burr 528, such as to a finger or other body part of a person handling the welded work pieces 516 and 518 following welding.

FIGS. 6A-6C illustrate an example friction stir welding tool for use with a process herein according to some implementations. In this example, as illustrated in FIG. 6A, the welding tool 108 may have a burr control device 600 that may be attached to, or which may be formed integral with, the welding tool 108. During the stir welding procedure, the burr control device 600 may assist in keeping the height H of the surface burr 122 below an upper edge 602 of the sidewall 130 of the channel 124. In some cases, the burr control device 600 may be a cylindrical member affixed to the welding tool 108, such as with setscrews, a clamp, or other fastening elements (not shown in FIG. 6A). In other cases, the burr control device 600 may be formed as part of the welding tool 108, or may be otherwise integral with the welding tool 108. In the illustrated example, the burr control device 600 may have a diameter X that is greater than the width W of the channel 124. The burr control device 600 includes a lower face 606 that may include a smooth surface and that is located a distance Y from the shoulder 112 of the tool 108. The distance Y may be the same as or slightly greater than the depth D of the channel 124.

The burr control device 600 may be made of steel or other hard metal. The lower face 606 of the burr control device 600 is sufficiently smooth to only blunt the surface burr 122 while the surface burr 122 is still somewhat plastic, and not grind the surface burr 122. Therefore, any particles produced by contact with the surface burr 122 are minimized. In this example, the burr control device 600 is attached to, or is integral with, the welding tool 108 and rotates at the same rotation rate as the welding tool 108. In other examples, as discussed below, e.g., with respect to FIGS. 8A-10B, the burr control devices may be attached to or integral with a non-rotating part such as a machine head, so that the respective burr control device only moves linearly as the welding tool 108 transverses along the weld seam 106, but does not rotate with the welding tool 108.

As illustrated in FIG. 6B, during welding, the burr control device 600 may be positioned on or slightly above the surfaces 126 and 128 of the workpieces 102 and 104 respectively, as indicated by the clearance 608. The clearance 608 may depend on the size of the channel, size of the weld, material being welded, etc. but as a non-limiting example, the clearance 608 may typically be 2 millimeters or less. Accordingly, as illustrated in FIG. 6C, the burr control device 600 prevents the height H of the surface burr 122 from rising substantially above the edge 602 of the sidewall 130 of the channel 124. Thus, the surface burr 122 remains at or below the surfaces 126 and 128 of the workpieces 102 and 104, respectively.

FIGS. 7A-7C illustrate an example friction stir welding tool for use with a process herein according to some implementations. In this example, as indicated at FIG. 7A, the burr control device 600 has a diameter X that is less than the width W of the channel 124. Furthermore, the distance Y between the lower face 606 of the burr control device 600 and the shoulder 112 of the tool 108 is less than the depth D of the channel 124.

As indicated at FIG. 7B, the burr control device 600 is able to fit within the channel 124 with a slight clearance as indicated at 702. While the size of the clearance at 702 may depend at least in part on the size of the channel and the workpieces being welded, typically the clearance may be two millimeters or less. Accordingly, in this example, as indicated at FIG. 7C, the burr control device 600 maintains a height H of the surface burr 122 at or below the surfaces 126 and 128 of the workpieces 102 and 104 respectively.

As mentioned above, the burr control device 600 may be mounted on the welding tool 108 using setscrews, a clamp, or the like. Therefore, the burr control device 600 is movable along the length of the welding tool body 110 to enable adjustment of the distance Y, which enables adjustment to control the height H of the surface burr 122, such as based on the type of material being welded, the depth D of the channel 124, or the like. In other examples, however, the burr control device 600 may be formed integrally with the welding tool body 110 and might not be adjustable with regards to distance Y.

FIGS. 8A-8B illustrate an example friction stir welding tool including a burr control device 800 for use with a process herein according to some implementations. FIG. 8A illustrates a cross-sectional view of the burr control device 800. FIG. 8B illustrates a bottom view of the burr control device 800 as viewed along line 8B-8B of FIG. 8A. In this example, the burr control device 800 includes a cylindrical body 802 supported by one or more springs 802 that urge a lower face 804 of the cylindrical body 802 toward the workpiece (not shown in FIG. 8A) during welding for maintaining the lower face 804 in contact with one of the surface burr or the surface of the workpiece. The springs 802 may connect to a collar 806. In some examples, the burr control device 800 may rotate with the welding tool 108. In other examples, the burr control device 800 does not rotate, and the welding tool 108 rotates within the burr control device 800.

In addition, in some cases, the diameter X of the cylindrical body 802 is greater than the width of the channel, as discussed above with respect to FIGS. 6A-6C. In this case, the one or more springs 802 maintain the lower face 804 in contact with the surfaces of the workpieces. On the other hand, if the diameter X of the cylindrical body 802 is less than the width of the channel, as discussed above with respect to FIGS. 7A-7C, then the one or more springs 802 may maintain the lower face 804 in contact with the surface burr during the welding process. The springs 802 provide flexibility to the burr control device 800 to enable the lower face 804 to move up and down by flexing of the springs 802 for blunting or otherwise smoothing the surface burr during welding.

FIGS. 9A-9B illustrate an example friction stir welding tool including a burr control device 900 for use with a process herein according to some implementations. FIG. 9A illustrates a side view of the burr control device 900. FIG. 9B illustrates a bottom view of the burr control device 900 as viewed along line 9B-9B of FIG. 9A. In this example, the burr control device 900 includes a pair of burr smoothing rods 902 that extend downward from the springs 802 supported by the collar 806. In this example, the collar 806, the springs 802, and the burr smoothing rods 902 do not rotate with the welding tool 108. To the contrary, the collar 806 may be stationary and the springs 802 serve to urge the burr smoothing rods 902 toward the surface burr during welding. The bottom of the burr smoothing rods 902 may include a burr smoothing tip 904 on the outer edges that may blunt or otherwise smooth the surface burr as the surface burr is being generated during the welding process.

Figure 10A:
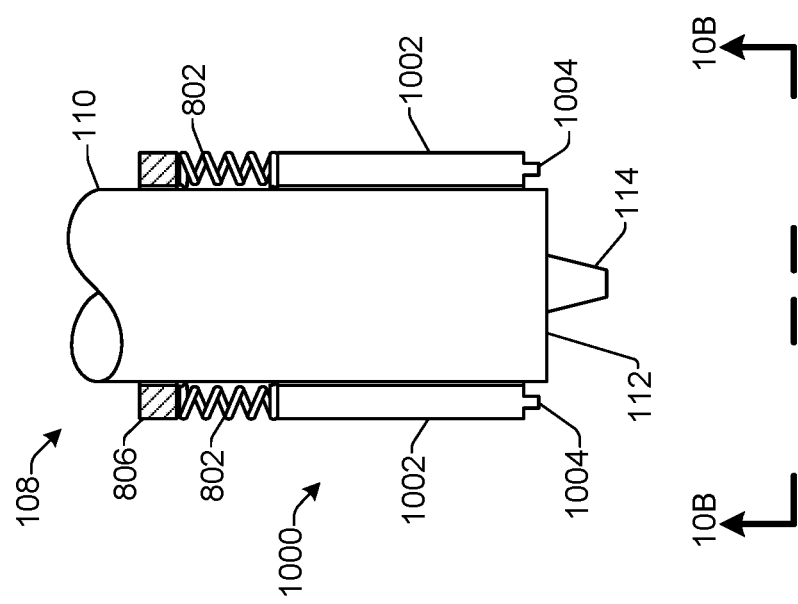

FIGS. 10A-10B illustrate an example friction stir welding tool including a burr control device 1000 for use with a process herein according to some implementations. FIG. 10A illustrates a side view of the burr control device 1000. FIG. 10B illustrates a bottom view of the burr control device 1000 as viewed along line 10B-10B of FIG. 10A. In this example, the burr control device 1000 includes a pair of burr smoothing rods 1002 that extend downward from the springs 802 supported by the collar 806. In this example, the collar 806, the springs 802, and the burr smoothing rods 1002 do not rotate with the welding tool 108. To the contrary, the collar 806 may be stationary and the springs 802 serve to urge the burr smoothing rods 1002 toward the surface burr during welding. The bottom of the burr smoothing rods 1002 may include a burr smoothing tip 1004 that may blunt or otherwise smooth the surface burr as the surface burr is being generated during the welding process. The burr smoothing tip 1004 in this example is located toward the center of the rod 1002, rather than at an outer edge, as in the example of FIG. 9 discussed above.

FIGS. 11A-11C illustrate a cross-sectional view of workpieces configured for a friction stir welding process according to some implementations. In this example, a first workpiece 1102 is placed over a second workpiece 1104 so that there is a seam 1106 between the first workpiece 1102 and the second workpiece 1104. A complete channel 1106 is formed in an upper surface 1108 of the first workpiece 1102 and is presented for receiving the welding tool 108 during welding of the first workpiece 1102 to the second workpiece 1104. Accordingly, in this example, the welding tool 108 may be used for spot welding or lap welding the first workpiece 1102 to the second workpiece 1104. In the case of spot welding, the channel 1106 may be in the form of a circular socket, rather than a longitudinal channel.

In either event, as indicated at FIG. 11B, the tool tip 114 of the welding tool 108 may be inserted into the material of the first workpiece 1102 and the material of the second workpiece 1104 for forming a weld joint 1110 as illustrated at FIG. 11C. The surface burr 1112 generated from the welding process is maintained within the channel 1106, below the surface 1108 of the first workpiece in a manner similar to that discussed above e.g., with respect to FIG. 1.

Figure 12:
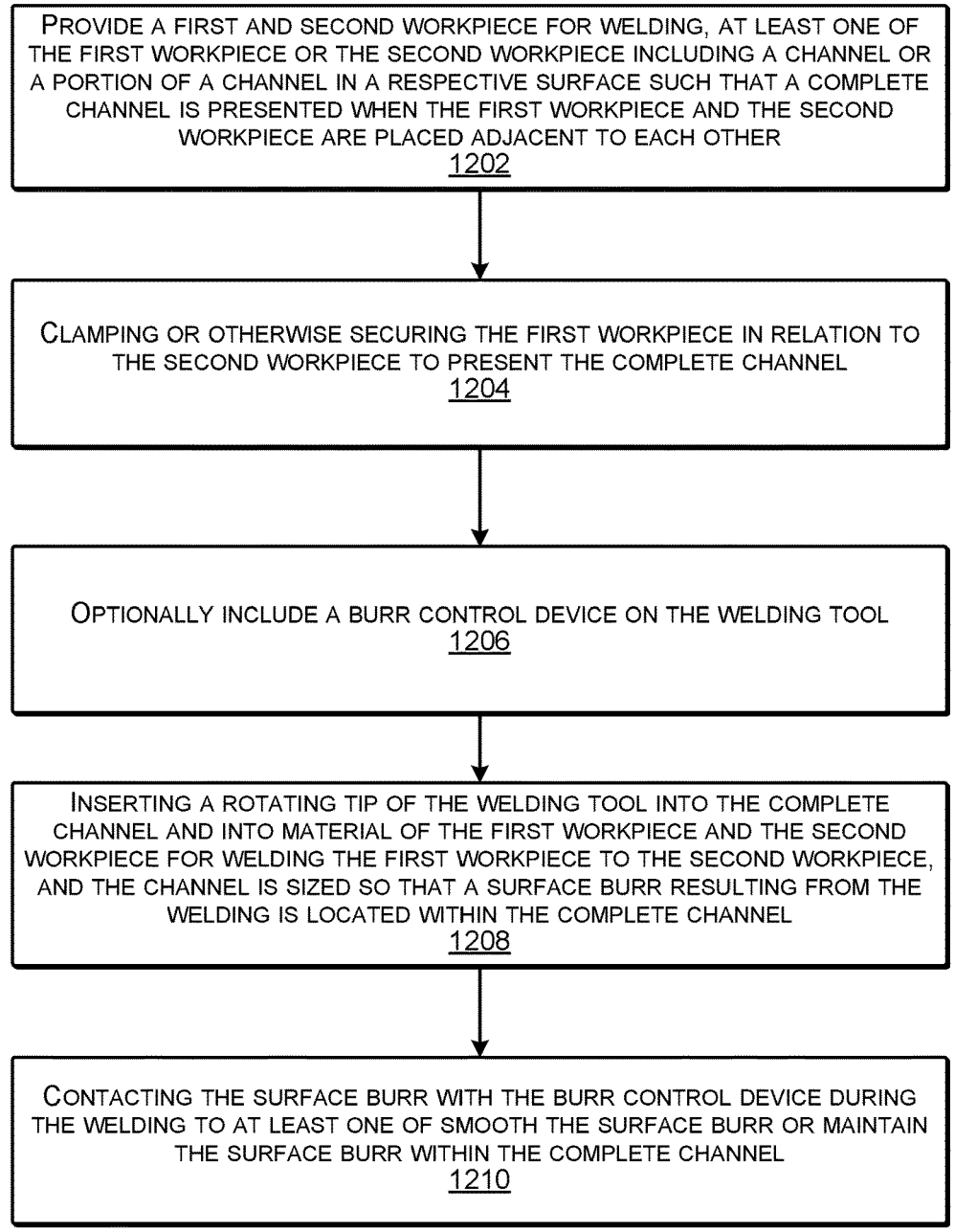
FIG. 12 is a flow diagram illustrating an example process for friction stir welding according to some implementations.

FIG. 12 is a flow diagram illustrating an example process 1200 for friction stir welding while controlling a surface burr according to some implementations. The process is illustrated as a collection of blocks in a logical flow diagram, which represent a sequence of operations. The order in which the blocks are described should not be construed as a limitation. In some cases, the described blocks can be combined, performed in a different order, and/or performed in parallel to implement the process, or alternative processes, and not all of the blocks need be executed. For discussion purposes, the process is described with reference to the environments and apparatus described in the examples herein, although the process may be implemented in a variety of other environments and apparatuses.

At 1202, a first and second workpiece are provided for welding. At least one of the first workpiece or the second workpiece includes a channel or a portion of a channel in a respective surface such that a complete channel is presented when the first workpiece and the second workpiece are placed adjacent to each other.

At 1204, the first workpiece is clamped or otherwise secured in relation to the second workpiece to present the complete channel.

At 1206, optionally, a burr control device may be included on the welding tool.

At 1208, a rotating tip of the welding tool is inserted into the complete channel and into material of the first workpiece and the second workpiece for welding the first workpiece to the second workpiece, and the channel is sized so that a surface burr resulting from the welding is located within the complete channel.

At 1210, in the case that the burr control device is used, the surface burr is contacted with a face of the burr control device during the welding to at least one of smooth the surface burr or maintain the surface burr within the complete channel.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A method for friction stir welding, the method comprising:
   providing a first workpiece having a first channel portion formed in a surface of the first workpiece;
   providing a second workpiece having a second channel portion formed in a surface of the second workpiece;
   placing the first workpiece adjacent to the second workpiece, with the first channel portion adjacent to the second channel portion to present a complete channel having sidewalls and a bottom surface; and
   inserting a rotating tip of a welding tool into the complete channel for welding together the first workpiece and the second workpiece, wherein a surface burr resulting from the welding is located within the complete channel,
   wherein the sidewalls of the complete channel include a first sidewall of the first workpiece and a second sidewall of the second workpiece,
   wherein the first sidewall and the second sidewall are slanted inward toward a center of the complete channel and are oblique with respect to one another, and
   wherein an upper portion of the complete channel at a top opening of the complete channel has a first width that is less than a second width extending from a first intersection of the first sidewall with the bottom surface of the complete channel and a second intersection of the second sidewall with the bottom surface of the complete channel.

2. The method as recited in claim 1, wherein the complete channel has a depth from the bottom surface to the surface of the first workpiece and to the surface of the second workpiece that is equal to or greater than a height of the surface burr.

3. The method as recited in claim 1, wherein:
   the first workpiece is a housing for a container and the second workpiece is a cover for the container;

placing the first workpiece adjacent to the second workpiece comprises placing the cover on the housing to form the complete channel at a seam between the cover and the housing; and inserting the rotating tip of the welding tool into the complete channel for welding together the first workpiece and the second workpiece comprises inserting the rotating tip into the seam between the cover and the housing.

4. The method as recited in claim 1, further comprising:
including on the welding tool a rotatable burr control device having a smooth face for contacting the surface burr; and during the welding, contacting the surface burr with the burr control device to at least one of smooth the surface burr or maintain the surface burr within the complete channel.

5. The method as recited in claim 1, further comprising:
including on the welding tool a burr control device having at least one spring for urging an end of the burr control device into contact with the surface burr; and preventing the end of the burr control device from rotating with the welding tool during the welding.

6. A method comprising:
securing a first workpiece adjacent to a second workpiece, at least one of the first workpiece or the second workpiece including a complete channel or a portion of a complete channel in a respective surface such that the complete channel is presented when the first workpiece and the second workpiece are secured adjacent to each other; and inserting a rotating tip of a welding tool into the complete channel for welding the first workpiece to the second workpiece, wherein a surface burr resulting from the welding is located within the complete channel, wherein sidewalls of the complete channel include a first sidewall and a second sidewall, wherein the first sidewall and the second sidewall are slanted inward toward a center of the complete channel and are oblique with respect to one another, and wherein a first width extending from the first sidewall to the second sidewall at a top opening of the complete channel is less than a second width extending from the first sidewall to the second sidewall at a bottom surface of the complete channel.

7. The method as recited in claim 6, wherein:
the first workpiece includes a first channel portion formed in the surface of the first workpiece;

the second workpiece includes a second channel portion formed in the surface of the second workpiece;

when the first workpiece is secured adjacent to the second workpiece, the complete channel is presented including the first and second sidewalls and the bottom surface; and a height of the surface burr from the bottom surface is less than a depth of the bottom surface from a top edge of each of the first and second sidewalls.

8. The method as recited in claim 6, wherein the first workpiece includes the complete channel formed in the surface of the first workpiece, the method further comprising:

securing the first workpiece adjacent to the second workpiece by securing the first workpiece over the second workpiece; and inserting the rotating tip of a welding tool into the complete channel for welding the first workpiece to the second workpiece by inserting the rotating tip through a bottom of the complete channel and into material of the second workpiece to weld the first workpiece to the second workpiece through a weld joint in the bottom of the complete channel.

9. The method as recited in claim 6, wherein a burr control device is mounted on the welding tool, the burr control device rotating with the welding tool and including a smooth face for contacting the surface burr, the method further comprising:

contacting the surface burr with the burr control device during welding to at least one of smooth the surface burr or maintain the surface burr within the complete channel.

10. The method as recited in claim 6, further comprising:
including on the welding tool a burr control device having at least one spring for urging an end of the burr control device into contact with the surface burr; and preventing the end of the burr control device from rotating with the welding tool during the welding.

11. The method as recited in claim 10, wherein the burr control device includes a pair of rods positioned parallel to an axis of rotation of the welding tool, each rod including a tip for smoothing the surface burr.

* * * * *